(12) United States Patent
Huh et al.

(10) Patent No.: US 10,012,772 B2
(45) Date of Patent: *Jul. 3, 2018

(54) POLARIZING PLATE AND IMAGE DISPLAY APPARATUS COMPRISING SAME

(71) Applicant: LG CHEM, LTD., Seoul (KR)

(72) Inventors: Eun-Soo Huh, Daejeon (KR);
Kwang-Seung Park, Daejeon (KR);
Mi-Rin Lee, Daejeon (KR); Jun-Wuk Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 218 days.

This patent is subject to a terminal disclaimer.

(21) Appl. No.: 15/025,144

(22) PCT Filed: Sep. 29, 2014

(86) PCT No.: PCT/KR2014/009130
§ 371 (c)(1),
(2) Date: Mar. 25, 2016

(87) PCT Pub. No.: WO2015/046999
PCT Pub. Date: Apr. 2, 2015

(65) Prior Publication Data
US 2016/0245959 A1    Aug. 25, 2016

(30) Foreign Application Priority Data

Sep. 30, 2013 (KR) .................. 10-2013-0117043
Sep. 26, 2014 (KR) .................. 10-2014-0129388

(51) Int. Cl.
| | |
|---|---|
| *G02B 1/14* | (2015.01) |
| *G02B 5/30* | (2006.01) |
| *G02B 1/04* | (2006.01) |
| *C09D 133/14* | (2006.01) |

(52) U.S. Cl.
CPC ............ *G02B 1/14* (2015.01); *C09D 133/14* (2013.01); *G02B 1/04* (2013.01); *G02B 5/30* (2013.01); *G02B 5/3033* (2013.01)

(58) Field of Classification Search
None
See application file for complete search history.

(56) References Cited

U.S. PATENT DOCUMENTS

| | | | | |
|---|---|---|---|---|
| 9,651,716 | B2 * | 5/2017 | Huh | ............ G02B 1/14 |
| 9,790,403 | B2 * | 10/2017 | Huh | ............ C09J 4/00 |

| | | | |
|---|---|---|---|
| 2006/0134400 | A1 | 6/2006 | Takada et al. |
| 2006/0188712 | A1 | 8/2006 | Okada et al. |
| 2007/0212627 | A1 | 9/2007 | Yanagawa et al. |
| 2008/0233515 | A1 | 9/2008 | Ito et al. |
| 2009/0086326 | A1 | 4/2009 | Hamamoto et al. |
| 2010/0002298 | A1 | 1/2010 | Sugino et al. |
| 2011/0244218 | A1 | 10/2011 | Suzuki et al. |
| 2013/0208197 | A1 | 8/2013 | Kim et al. |
| 2014/0106149 | A1 | 4/2014 | Seo et al. |

FOREIGN PATENT DOCUMENTS

| | | |
|---|---|---|
| CN | 101038449 A | 9/2007 |
| CN | 101344608 A | 1/2009 |
| CN | 101672946 A | 3/2010 |
| CN | 103314317 A | 9/2013 |
| JP | 2007-041533 A | 2/2007 |
| JP | 2007-046031 A | 2/2007 |
| JP | 2008-105191 A | 5/2008 |
| JP | 2008-151998 A | 7/2008 |
| JP | 2008-545044 A | 12/2008 |
| JP | 2009-037223 A | 2/2009 |
| JP | 2009-288681 A | 12/2009 |
| JP | 4459880 B2 | 2/2010 |
| JP | 2010-066484 A | 3/2010 |
| JP | 2010-248281 A | 11/2010 |
| JP | 2011-208102 A | 10/2011 |
| JP | 2012-052000 A | 3/2012 |
| JP | 2013-037057 A | 2/2013 |
| KR | 10-0691039 B1 | 3/2007 |
| KR | 10-2012-0006081 A | 1/2012 |
| KR | 10-2012-0015780 A | 2/2012 |
| KR | 10-2013-0023181 A | 3/2013 |
| KR | 10-2013-0054933 A | 5/2013 |
| KR | 10-1279612 B1 | 6/2013 |
| TW | 200811599 A | 3/2008 |
| WO | 2007/001811 A1 | 1/2007 |
| WO | 2007/052912 A1 | 5/2007 |

OTHER PUBLICATIONS

Liang, et al.: "Photopolymerization and Thermal Behavior of Phosphate Diacrylate and Triacrylate Used as Reactive-Type Flame-Retardant Monomers in Ultraviolet-Curable Resins", Journal of Applied Polymer Science, vol. 97, pp. 185-194 (2005).

* cited by examiner

*Primary Examiner* — Sheeba Ahmed
(74) *Attorney, Agent, or Firm* — Dentons US LLP

(57) ABSTRACT

The present invention relates to a polarizing plate including: a polarizer; and a protective layer formed on at least one surface of the polarizer, in which the protective layer is a cured product of a radical curable composition including: (A) a radical polymerizable compound including at least one hydrophilic functional group in a molecule thereof; (B) a multifunctional (meth)acrylic compound; (C) a phosphate compound including one or two (meth)acryl groups in a molecule thereof; and (D) a radical initiator, and an image display device including the same.

11 Claims, No Drawings

POLARIZING PLATE AND IMAGE DISPLAY APPARATUS COMPRISING SAME

This application is a National Stage entry of International Application No. PCT/KR2014/009130, filed on Sep. 29, 2014, which claims the benefit of and priority to Korean Application Nos. 10-2013-0117043, filed Sep. 30, 2013, and 10-2014-0129388, filed Sep. 26, 2014, all of which are hereby incorporated by reference in their entirety.

TECHNICAL FIELD

The present invention relates to a polarizing plate and an image display device including the same, and more specifically, to a polarizing plate which has excellent adhesion between a polarizer and a protective layer, is excellent in water resistance, and may be manufactured as a thin-type, and an image display device including the same.

BACKGROUND ART

A polarizing plate has been usually used in a structure, in which a protective film is stacked on both surfaces of a polarizer formed of a polyvinyl alcohol (hereinafter, referred to as 'PVA')-based resin dyed with a dichroic dye or iodine. In this case, a triacetyl cellulose (TAC)-based film has been frequently used as the protective film because the film is excellent in optical transparency or moisture permeability.

Meanwhile, as a liquid crystal display device has recently been developed into a mobile device such as a laptop personal computer, a cellular phone and a car navigation system, it is required that a polarizing plate which constitutes a liquid crystal display device is thin and light weight. However, in a polarizing plate in which a TAC film and the like are laminated as the protective film as described above, it is difficult to maintain a thickness of the protective film at 20 μm or less from the viewpoint of handling property or durability performance during the operation, so that there is a limitation for the liquid crystal device to be thin and light weight.

In order to solve the aforementioned problems, a technology has been suggested, in which a protective film is provided on only one surface of a polarizer, and a transparent thin film layer is formed by coating an active energy ray curable composition on the other surface thereof. Meanwhile, the active energy ray curable composition which has been suggested may be classified into a radical curable composition and a cationic curable composition according to the curing method. In this case, when a transparent thin film layer is formed using a cationic curable composition, there is an advantage in that excellent adhesion with the polarizer is achieved, but there are many disadvantages in the manufacturing process due to a slow curing rate and a low degree of curing.

In order to solve such problems of the cationic curable composition, a technology has been suggested, in which a transparent thin film layer is formed by using a radical curable composition which includes an acrylic or acryl amide-based compound as a main component. However, in the case of a radical curable composition including an acrylic or acrylamide-based compound as a main component, there are problems in that the curing rate is fast compared to a cationic curable composition, but the curing rate becomes slow under a high humidity atmosphere, and water resistance is not good such that a transparent protective layer formed by using the same does not have sufficient adhesion with a polarizer, and iodide ions in the polarizer are affected.

Therefore, there is a need for a new polarizing plate, which is excellent in adhesion between a polarizer and a protective layer, and is excellent in water resistance while having a thin protective layer which may be formed by curing radicals.

DISCLOSURE

Technical Problem

The present invention has been made in an effort to solve the aforementioned problem and provide a polarizing plate, which has excellent adhesion between a polarizer and a protective layer and is excellent in water resistance, and may be manufactured as a thin-type, and an image display device including the same.

Technical Solution

In one aspect, the present invention provides a polarizing plate including: a polarizer; and a protective layer formed on at least one surface of the polarizer, in which the protective layer is a cured product of a radical curable composition including: (A) a radical polymerizable compound having at least one hydrophilic functional group in a molecule thereof; (B) a multifunctional (meth)acrylic compound; (C) a phosphate compound having one or two (meth)acryl groups in a molecule thereof; and (D) a radical initiator.

In this case, it is preferred that the radical curable composition includes more than 30 parts by weight and 93 parts by weight or less of (A) the radical polymerizable compound having at least one hydrophilic functional group in a molecule thereof; 5 to 40 parts by weight of (B) the multifunctional (meth)acrylic compound; 1 to 40 parts by weight of (C) the phosphate compound including one or two (meth)acryl groups in a molecule thereof; and (D) 0.5 to 20 parts by weight of the radical initiator, based on 100 parts by weight of the radical curable composition.

Further, it is preferred that the radical curable composition has a total hydroxyl value of 500 to 900 mg KOH/g.

Meanwhile, the hydrophilic functional group of (A) the radical curable composition is preferably a hydroxy group.

Meanwhile, it is more preferred that as (A) the radical polymerizable compound, a mixture of (a-1) a radical polymerizable compound having one hydroxy group in a molecule thereof and (a-2) a radical polymerizable compound having at least two hydroxy groups in a molecule thereof is used.

In addition, it is preferred that (b) the radical polymerizable compound has an acid value of 100 to 1,000 mg·KOH/g.

Meanwhile, it is preferred that (B) the multifunctional (meth)acrylic compound includes one or more selected from the group consisting of compounds represented by the following [Formula I] to [Formula III].

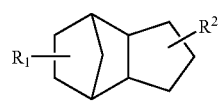

[Formula I]

In [Formula I], $R_1$ and $R_2$ are each independently a (meth)acryloyloxy group or a (meth)acryloyloxy alkyl group.

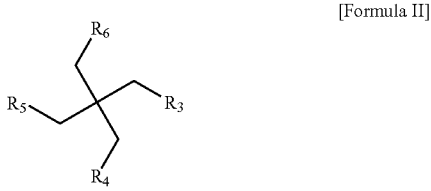

[Formula II]

In [Formula II], $R_3$, $R_4$ and $R_5$ are each independently a (meth)acryloyloxy group, or a (meth)acryloyloxy alkyl group, and $R_6$ is a (meth)acryloyloxy group, a (meth)acryloyloxy alkyl group, a hydroxy group, or a substituted or unsubstituted $C_{1\sim10}$ alkyl group.

[Formula III]

In [Formula III], $R_7$ is a substituted or unsubstituted $C_{1\sim10}$ alkylene, and $R_8$ and $R_9$ are each independently a (meth) acryloyloxy group or a (meth)acryloyloxy alkyl group.

Meanwhile, it is preferred that (C) the phosphate compound includes a compound represented by the following [Formula IV].

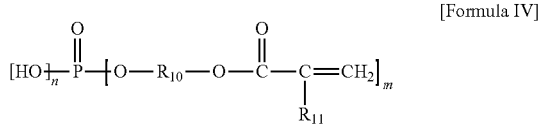

[Formula IV]

In [Formula IV], $R_{10}$ is a substituted or unsubstituted $C_{1\sim10}$ alkylene group, a substituted or unsubstituted $C_{4\sim14}$ cycloalkylene group, a substituted or unsubstituted $C_{6\sim14}$ arylene group, or a combination thereof; $R_{11}$ is hydrogen or a methyl group; and n is an integer of 1 and 2, m is an integer of 1 and 2, and n+m=3.

Meanwhile, it is preferred that the protective layer has a thickness of 0.5 to 20 μm.

Meanwhile, in the polarizing plate of the present invention, a protective film may be further attached to a surface opposite to a surface of the polarizer, on which a protective layer is formed, through an adhesive layer.

Furthermore, the polarizing plate of the present invention may further include an adhesion layer at the upper portion of the protective layer.

In another aspect, the present invention provides an image display device including the polarizing plate.

Advantageous Effects

The polarizing plate of the present invention has excellent adhesion between a polarizer and a protective layer, and is excellent in water resistance such that discoloration of iodide ions in the polarizer may be prevented even under a high humidity environment. Further, the polarizing plate of the present invention has a protective layer having a small thickness as compared to a polarizing plate having a transparent protective film in the related art, and thus may be manufactured as a thin-type.

MODE FOR INVENTION

Hereinafter, preferred exemplary embodiments of the present invention will be described. However, the exemplary embodiments of the present invention may be modified in various forms, and the scope of the present invention is not limited to the exemplary embodiments which will be described below. Further, exemplary embodiments of the present invention are provided to more completely explain the present invention to a person with ordinary skill in the art.

1. Polarizing Plate

As a result of repeated studies, the present inventors have found that when a multifunctional (meth)acrylic compound is used in mixture with a phosphate compound having one or two (meth)acryl groups in a molecule thereof in a radical curable composition having a hydrophilic functional group for forming a protective layer, adhesion and water resistance are excellent, thereby completing the present invention.

More specifically, the present invention is a polarizing plate including: a polarizer; and a protective layer formed on at least one surface of the polarizer, in which the protective layer is a cured product of a radical curable composition including: (A) a radical polymerizable compound having at least one hydrophilic functional group in a molecule thereof; (B) a multifunctional (meth)acrylic compound; (C) a phosphate compound having one or two (meth)acryl groups in a molecule thereof; and (D) a radical initiator.

1-1. Polarizer

First, as the polarizer of the present invention, it is possible to use a polarizer well known in the art, for example, a film composed of polyvinyl alcohol (PVA) including iodine or a dichroic dye. The polarizer may be manufactured by dyeing iodine or a dichromatic dye to the PVA film, but the manufacturing method thereof is not particularly limited. In the present specification, the polarizer refers to a state in which the polarizer does not include a protective layer (or a protective film), and the polarizing plate refers to a state in which the polarizing plate includes a polarizer and a protective layer (or a protective film).

Meanwhile, when the polarizer is a polyvinyl alcohol-based film, the polyvinyl alcohol-based film may be used without particular limitation as long as the film includes a polyvinyl alcohol resin or a derivative thereof. In this case, examples of the derivative of the polyvinyl alcohol resin include, but are not limited to, a polyvinyl formal resin, a polyvinyl acetal resin and the like. Also, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., and M3000 and M6000 manufactured by Nippon Synthetic Chemical Industry Co., Ltd., and the like.

Meanwhile, the degree of polymerization of the polyvinyl alcohol-based film may be in a range of 1,000 to 10,000, preferably, in a range of 1,500 to 5,000, but is not limited thereto. This is because when the degree of polymerization satisfies the range, molecules freely move, and may be flexibly mixed with iodine or a dichroic dye, and the like.

1-2. Protective Layer

Next, the protective layer of the present invention is formed by using the radical curable composition in order to support and protect a polarizer, and may be formed by a method well known in the art. For example, the protective layer may be formed by a method of applying the radical curable composition on one surface of a polarizer to form a protective layer by a coating method well known in the art, for example, a methods such as spin coating, bar coating, roll coating, gravure coating and blade coating, and then curing the protective layer through irradiation of an active energy ray. The method of irradiating an active energy ray is not particularly limited, and for example, may be performed by irradiating UV light at 10 to about 2,500 mJ/cm$^2$ using a UV light irradiation device (fusion lamp, D bulb).

In this case, the radical curable composition of the present invention includes: (A) the radical polymerizable compound having at least one hydrophilic functional group in a molecule thereof; (B) the multifunctional (meth)acrylic compound; (C) the phosphate compound including one or two (meth)acryl groups in a molecule thereof; and (D) the radical initiator.

More preferably, the radical curable composition of the present invention includes more than 30 parts by weight and 93 parts by weight or less of (A) the radical polymerizable compound including at least one hydrophilic functional group in a molecule thereof; 5 to 40 parts by weight of (B) the multifunctional (meth)acrylic compound; 1 to 40 parts by weight of (C) the phosphate compound including one or two (meth)acryl groups in a molecule thereof; and (D) 0.5 to 20 parts by weight of the radical initiator, based on 100 parts by weight of the radical curable composition.

A. (A) Radical Polymerizable Compound

First, the radical polymerizable compound included in the radical curable composition according to the present invention is a component for implementing adhesion between a polarizer and a protective layer, may have at least one hydrophilic functional group in a molecule thereof to implement adhesion through a hydrogen bond, and may also be used without particular limitation as long as the radical polymerizable compound may achieve the radical polymerization due to the presence of an unsaturated double bond between carbons in a molecule thereof. In this case, the hydrophilic functional group is not particularly limited as long as the hydrophilic functional group may obtain a hydrogen bond, such as a hydroxy group, a carboxyl group, a urethane group, an amine group, and an amide group, but among them, particularly, a hydroxy group or a carboxyl group is more preferred for implementing excellent adhesion.

More specifically, (A) the radical polymerizable compound may be, but is not limited to, for example, a compound represented by the following [Formula 1] to [Formula 24]. These may be used either alone or in a mixture.

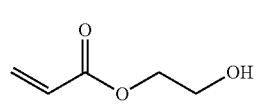 [Formula 1]

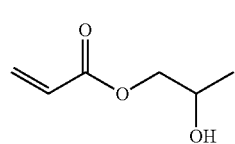 [Formula 2]

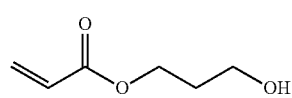 [Formula 3]

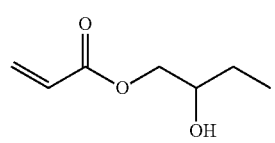 [Formula 4]

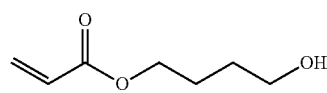 [Formula 5]

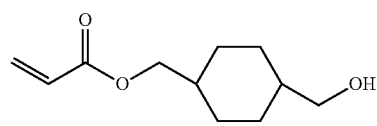 [Formula 6]

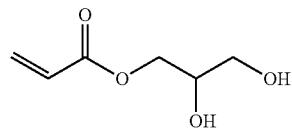 [Formula 7]

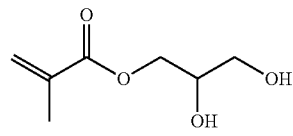 [Formula 8]

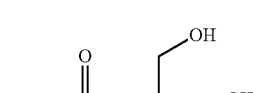 [Formula 9]

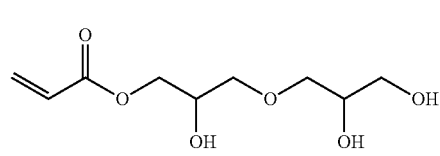 [Formula 10]

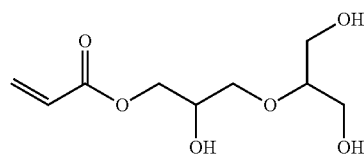 [Formula 11]

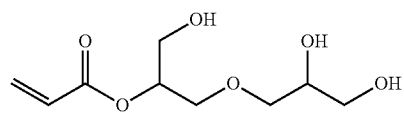 [Formula 12]

[Formula 13]
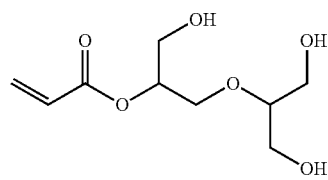

[Formula 14]
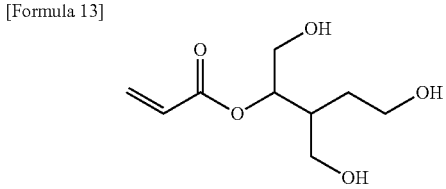

[Formula 15]
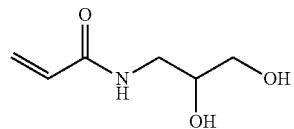

[Formula 16]
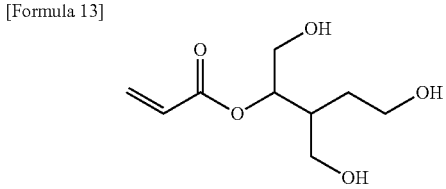

[Formula 17]
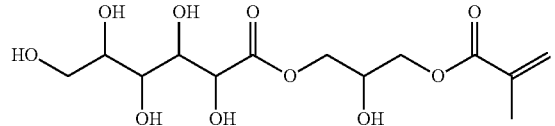

[Formula 18]
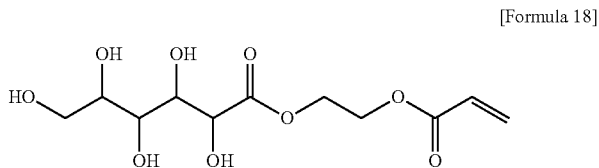

[Formula 19]
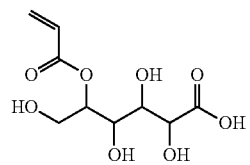

[Formula 20]
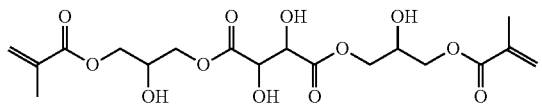

[Formula 21]
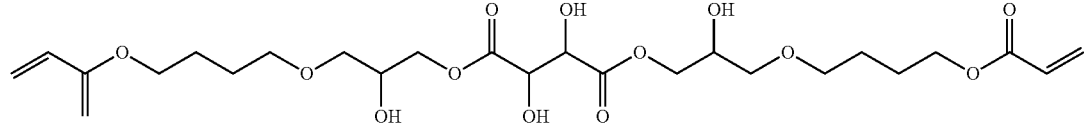

[Formula 22]
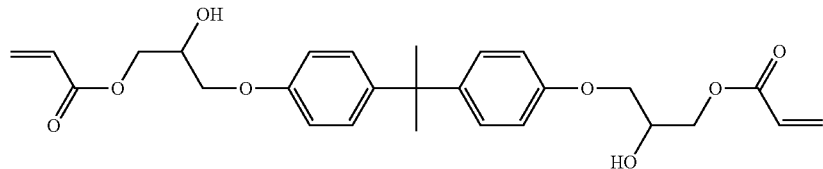

[Formula 23]
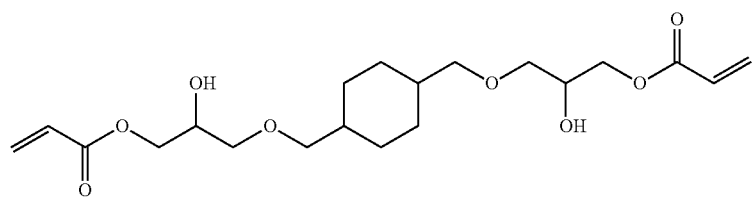

[Formula 24]
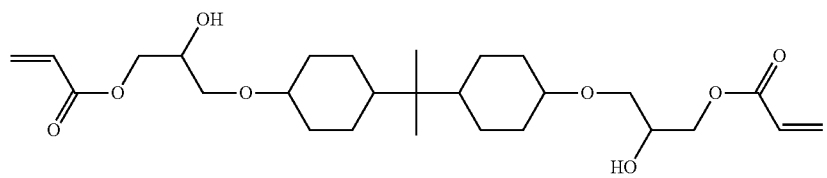

Meanwhile, the radical polymerizable compound is not limited thereto, but it is preferred to use particularly a mixture of (a-1) a radical polymerizable compound having at least one hydroxy group in a molecule thereof (for example, [Formula 1] to [Formula 6] and the like) and (a-2) a radical polymer having at least two hydroxy groups in a molecule thereof (for example, [Formula 7] to [Formula 24] and the like) among them in terms of implementing excellent adhesion and securing heat resistance.

Meanwhile, the content of the radical polymerizable compound of the present invention may be more than 30 parts by weight to 93 parts by weight or less, preferably 35 to 90 parts by weight, and more preferably 45 to 90 parts by weight, based on 100 parts by weight of the radical curable composition. This is because when the radical polymerizable compound is included in such content, excellent adhesion may be implemented.

B. (B) Multifunctional (Meth)Acrylic Compound

Next, the multifunctional (meth)acrylic compound included in the radical curable composition according to the present invention is a component for increasing the degree of crosslinking in the protective layer to improve water resistance and exhibit stable physical properties even in a high humidity environment, and it is possible to use various multifunctional (meth)acrylic compound widely known in the art without particular limitation. However, in the present specification, except for the following multifunctional (meth)acrylic compounds enumerated as an example, a compound corresponding to the above-described (A) compound and (E) a compound to be described below is excluded from the multifunctional (meth)acrylic compounds.

In the present invention, examples of the multifunctional (meth)acrylic compound include ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylol propane di(meth)acrylate, pentaerythritol di(meth)acrylate, ditrimethylol propane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxypivalic acid ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogenated dicyclopentadienyl di(meth)acrylate, tricyclodecane dimethaneol di(meth)acrylate, 1,3-dioxane-2,5-diyl di(meth)acrylate, di(meth)acrylate of 2-(2-hydroxy-1,1-dimethylethyl)-5-ethyl-5-hydroxymethyl-1,3-dioxane, tris(hydroxyethyl)isocyanurate di(meth)acrylate, glycerin tri(meth)acrylate, trimethylolpropane tri(meth)acrylate, di trimethyolpropane tri(meth)acrylate, di trimethylol propane tetra(meth)acrylate, pentaerythritol tri(meth)acrylate, pentaerythritol tetra(meth)acrylate, di pentaerythritol tetra(meth)acrylate, di pentaerythritol penta(meth)acrylate, di pentaerythritol hexa (meth)acrylate and the like. These may be used either alone or in a mixture.

Meanwhile, the multifunctional (meth)acrylic compound is more preferably one or more selected from the group consisting of compounds represented by the following [Formula I] to [Formula III], but is not limited thereto. This is because water resistance improvement effects are still excellent.

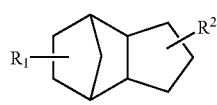

[Formula I]

In [Formula I], $R_1$ and $R_2$ are each independently a (meth)acryloyloxy group or a (meth)acryloyloxy alkyl group.

In this case, in $R_1$ and $R_2$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. The remaining one or more hydrogen atoms included in the alkyl may be substituted with any substituent.

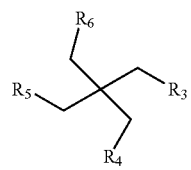

[Formula II]

In [Formula II], $R_3$, $R_4$ and $R_5$ are each independently a (meth)acryloyloxy group, or a (meth)acryloyloxy alkyl group, and $R_6$ is a (meth)acryloyloxy group, a (meth)acryloyloxy alkyl group, a hydroxy group, or a substituted or unsubstituted $C_{1\sim10}$ alkyl group.

In this case, in $R_3$, $R_4$, $R_5$ and $R_6$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. The remaining one or more hydrogen atoms included in the alkyl may be substituted with any substituent.

Further, in $R_6$, the alkyl group refers to a straight-chained or branch-chained hydrocarbon moiety having 1 to 10, or 1 to 8, or 1 to 4 carbon atoms, and one or more hydrogen atoms included in the alkyl group may be substituted with any substituent.

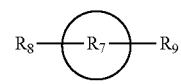

[Formula III]

In [Formula III], $R_7$ is a substituted or unsubstituted $C_{1\sim10}$ alkylene, and $R_8$ and $R_9$ are each independently a (meth)acryloyloxy group or a (meth)acryloyloxy alkyl group.

In this case, in $R_7$, the alkylene refers to a straight-chained or branch-chained divalent hydrocarbon moiety having 1 to 10, or 1 to 8, or 1 to 6 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene may be substituted with any substituent.

Furthermore, in $R_8$ and $R_9$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. The remaining one or more hydrogen atoms included in the alkyl may be substituted with any substituent.

More specifically, (B) the multifunctional (meth)acrylic compound is particularly preferably one or more selected from the group consisting of compounds represented by the following [Formula 25] to [Formula 28], but is not limited thereto.

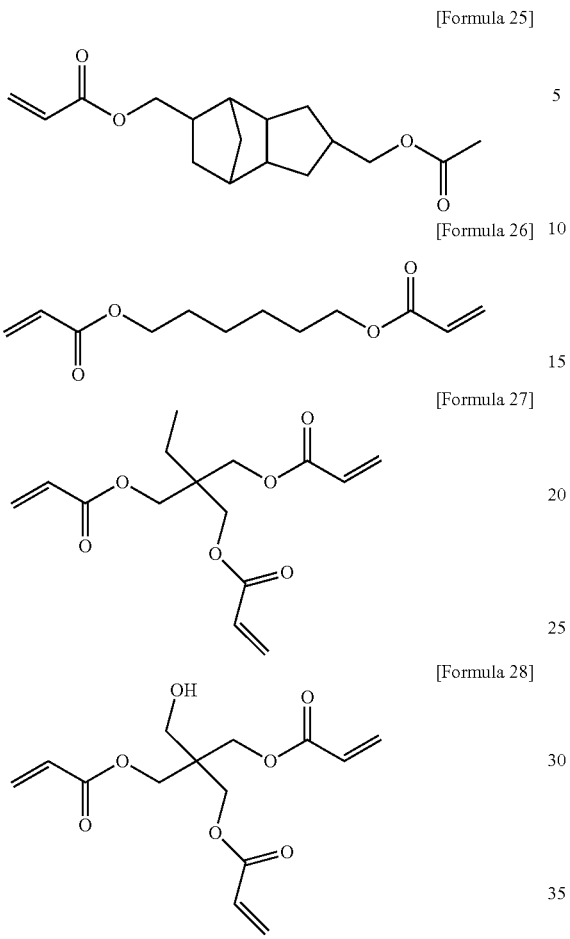

[Formula 25]

[Formula 26]

[Formula 27]

[Formula 28]

Meanwhile, the content of the multifunctional (meth) acrylic compound of the present invention may be 5 to 40 parts by weight, preferably 5 to 35 parts by weight, and more preferably 5 to 30 parts by weight, based on 100 parts by weight of the radical curable composition. When the content of the multifunctional (meth)acrylic compound is more than the range, adhesion may not be sufficient, and when the content is less than the range, water resistance may be reduced.

C. (C) Phosphate Compound

Next, the phosphate compound included in the radical curable composition according to the present invention is a component for further enhancing adhesion and water resistance of the protective layer, and it is possible to use various phosphate compounds including one or two (meth)acryl groups in a molecule thereof. According to the study results of the present inventors of the present invention, it is difficult to secure sufficient adhesion and water resistance only by adding the multifunctional (meth)acrylic compound, and only when the phosphate compound including one or two (meth)acryl groups in a molecule thereof and the multifunctional (meth)acrylic compound are simultaneously added, it is possible manufacture a protective layer which satisfies both excellent adhesion and water resistance.

Meanwhile, the phosphate compound is not limited to, but is more preferably a compound represented by the following [Formula V]. This is because an effect of enhancing adhesion and water resistance is particularly excellent.

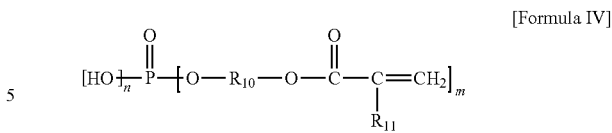

[Formula IV]

In [Formula IV], $R_{10}$ is a substituted or unsubstituted $C_{1\sim10}$ alkylene group, a substituted or unsubstituted $C_{4\sim14}$ cycloalkylene group, a substituted or unsubstituted $C_{6\sim14}$ arylene group, or a combination thereof; $R_{11}$ is hydrogen or a methyl group; and n is an integer of 1 and 2, m is an integer of 1 and 2, and n+m=3.

In this case, in $R_{10}$, the alkylene group refers to a straight-chained or branch-chained divalent hydrocarbon moiety having 1 to 10, or 1 to 8, or 1 to 4 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_{10}$, the cycloalkylene group refers to a non-aromatic divalent monocyclic, bicyclic or tricyclic hydrocarbon moiety of 4 to 14, or 4 to 10, or 4 to 6 ring carbons, and the alkylene group in the present specification may also include at least one unsaturated bond in a molecule thereof. Meanwhile, examples of the cycloalkylene group include, but are not limited to, a divalent cyclopentane ring, a divalent cyclohexane ring and the like. One or more hydrogen atoms included in the cycloalkylene group may be substituted with any substituent.

Furthermore, in $R_{10}$, the arylene group refers to a divalent monocyclic, bicyclic or tricyclic aromatic hydrocarbon moiety having 6 to 14, or 6 to 12 ring atoms, and examples thereof include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, $R_{10}$ is not limited thereto, but among them, is preferably a substituted or unsubstituted $C_{1\sim10}$ alkylene group, more preferably a substituted or unsubstituted $C_{1\sim8}$ alkylene group, and even more preferably a substituted or unsubstituted $C_{1\sim4}$ alkylene group.

More specifically, the phosphate compound is particularly preferably one or more selected from the group consisting of compounds represented by the following [Formula 29] to [Formula 32], but is not limited thereto.

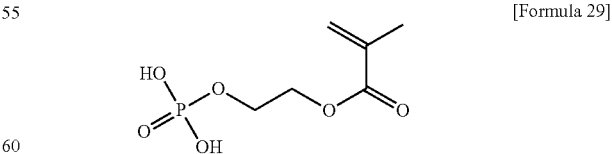

[Formula 29]

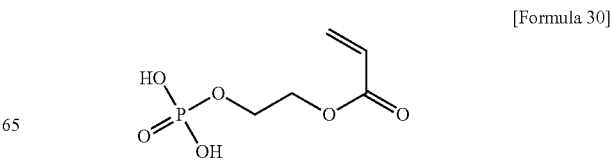

[Formula 30]

[Formula 31]

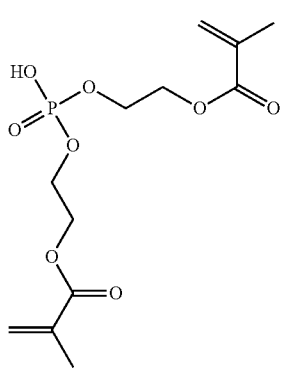

[Formula 32]

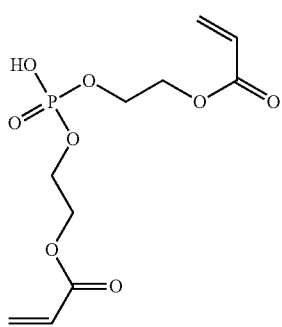

Meanwhile, the content of the phosphate compound of the present invention may be 1 to 40 parts by weight, preferably 1 to 35 parts by weight, and more preferably 1 to 30 parts by weight, based on 100 parts by weight of the radical curable composition. When the content of the phosphate compound is more than the range, adhesion and the glass transition temperature may be reduced, and when the content is less than the range, water resistance may be reduced.

D. (D) Radical Initiator

Next, the radical initiator included in the radical curable composition according to the present invention is for promoting radical polymerizability to enhance the curing rate. In this case, as the radical initiator, radical initiators generally used in the art may be used without limitation, and the radical initiator may be, for example, one or more selected from the group consisting of 1-hydroxy-cyclohexyl-phenylketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, and phenylbis(2,4,6-trimethylbenzoyl)-phosphineoxide. Particularly in the present invention, the radical initiator is preferably phenylbis(2,4,6-trimethylbenzoyl)-phosphineoxide.

Meanwhile, it is preferred that (C) the content of the radical initiator is 0.5 to 20 parts by weight, 0.5 to 15 parts by weight, or 0.5 to 10 parts by weight, based on 100 parts by weight of the radical curable composition. This is because when the content of the radical initiator satisfies the numerical range, the protective layer may be smoothly cured.

E. Physical Properties of Composition

Meanwhile, the aforementioned radical curable composition of the present invention has a total hydroxyl value of 500 to 900 mg·KOH/g, more preferably 500 to 850 mg·KOH/g, and even more preferably 500 to 800 mg·KOH/g. When the hydroxyl value of the radical curable composition satisfies the numerical range as described above, there is an advantage in that a protective layer formed by using the composition may stably maintain high adhesion with a polarizer even under a relatively high humidity condition, and there is also an advantage in that the bonding strength inside an adhesive cured is so strong that the protective layer has a high glass transition temperature, and accordingly, thermal stability may be secured.

Meanwhile, the hydroxyl value refers to the number of mg of potassium hydroxide (KOH) required to neutralize acetic acid bonded to a hydroxy group when 1 g of a sample is acetylated, and the measurement method is not particularly limited. For example, the hydroxyl value in a sample may be calculated through the following Equation (1).

$$\text{(molecular weight of KOH} \times \text{number of —OH in a sample} \times 1{,}000)/\text{molecular weight of the sample} \quad \text{Equation (1):}$$

Furthermore, the glass transition temperature of the radical curable composition after curing is 50° C. or more, and may be, for example, 80° C. to 300° C., or 90° C. to 200° C. When the radical curable composition has a glass transition temperature in the numerical range as described above, the protective layer may have excellent heat resistance and water resistance.

Further, it is preferred that the radical curable composition has a viscosity of 10 to 300 cP or 20 to 100 cP. When the viscosity of the composition satisfies the numerical range, there is an advantage in that workability is excellent because the protective layer may be thinly formed, and has a low viscosity.

Meanwhile, the thickness of a protective layer formed by using the radical curable composition is preferably 0.5 to 20 μm, and may be, for example, 0.5 to 15 μm or 0.5 to 10 μm. This is because a polarizing plate manufactured may become thin and light weight when the thickness of the protective layer satisfies the range. When the thickness is less than 0.5 μm, thermal impact stability and curl characteristics of the polarizer are vulnerable, and when the thickness is 20 μm or more, it is difficult to make the polarizing plate thin and light weight.

1-3. Protective Film

Meanwhile, the polarizing plate of the present invention may further include a protective film on one surface of the polarizer, if necessary. More specifically, when the protective layer is formed on one surface of the polarizer in the polarizing plate of the present invention, a separate protective film may be attached to a surface opposite to the surface, on which a protective layer is formed, through an adhesive layer in order to support and protect the polarizer.

In this case, the protective film is provided for supporting and protecting a polarizer, and it is possible to use protective films formed of various materials generally known in the art, for example, a cellulose-based film, a polyethylene terephthalate (PET) film, a cycloolefin polymer (COP) film, an acrylic film and the like without limitation. Among them, it is particularly preferred that an acrylic film is used in consideration of optical properties, durability, economic efficiency and the like.

Meanwhile, the acrylic film which may be used in the present invention may be obtained by molding a molding material including a (meth)acrylate-based resin as a main component by extrusion molding. In this case, the (meth) acrylate-based resin includes a resin including a (meth) acrylate-based unit as a main component, and is a concept which includes not only a homopolymer resin composed of a (meth)acrylate-based unit but also a copolymer resin in which other monomer units other than the (meth)acrylate-based unit are copolymerized, and a blend resin in which other resins are blended with the aforementioned (meth) acrylate-based resin.

Meanwhile, the (meth)acrylate-based unit may be, for example, an alkyl(meth)acrylate-based unit. Here, the alkyl (meth)acrylate-based unit refers to both an alkyl acrylate-based unit and an alkyl methacrylate-based unit, and the alkyl group of the alkyl(meth)acrylate-based unit has preferably 1 to 10 carbon atoms, and more preferably 1 to 4 carbon atoms.

Further, examples of a monomer unit capable of being copolymerized with the (meth)acrylate-based unit include a styrene-based unit, a maleic anhydride-based unit, a maleimide-based unit and the like. In this case, examples of the styrene-based unit include, but are not limited to, styrene, α-methylstyrene and the like; examples of the maleic anhydride-based monomer include, but are not limited to, maleic anhydride, methyl maleic anhydride, cyclohexyl maleic anhydride, phenyl maleic anhydride, and the like; and examples of the maleimide-based monomer include, but are not limited to, maleimide, N-methyl maleimide, N-cyclohexyl maleimide, N-phenyl maleimide and the like. These may be used either alone or in a mixture.

Meanwhile, the acrylic film may be a film including a (meth)acrylate-based resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open Nos. 2000-230016, 2001-151814, and 2002-120326, and the like.

The method of manufacturing the acrylic film is not particularly limited, and for example, the acrylic film may be manufactured by sufficiently mixing a (meth)acrylate-based resin, other polymers, an additive and the like by any appropriate mixing method to manufacture a thermoplastic resin composition, and then film-molding the resin composition, or may also be manufactured by preparing the (meth) acrylate-based resin, other polymers, an additive and the like in separate solutions, mixing the solutions to form a homogeneous mixture solution, and then film-molding the mixture solution. In addition, the acrylic film may be an unstretched film, or a stretched film. The stretched film may be a uniaxially stretched film or a biaxially stretched film, and the biaxially stretched film may be a simultaneous biaxially stretched film or a sequential biaxially stretched film.

Meanwhile, the polarizing plate of the present invention may further include a primer layer between the adhesive layer and the protective film in order to further enhance adhesive strength. In this case, the primer layer may be formed by a method of applying a coating solution including a water-dispersible polymer resin, a water-dispersible particulate and water on a protective film by using a bar coating method, a gravure coating method and the like, and drying the coating solution. The water-dispersible polymer resin may be, for example, a water-dispersible polyurethane-based resin, a water-dispersible acrylic resin, a water-dispersible polyester-based resin or a combination thereof, and the like, and for the water-dispersible particulate, it is possible to use an inorganic-based particulate such as silica, titania, alumina and zirconia, or an organic-based particulate composed of a silicone-based resin, a fluorine-based resin, a (meth)acrylic resin, a crosslinked polyvinyl alcohol and a melamine-based resin, or a combination thereof, but the particulate is not limited thereto.

Meanwhile, the polarizer and the protective film may be attached by a method of applying an adhesive on the surface of the polarizer or the protective film by using a roll coater, a gravure coater, a bar coater, a knife coater, or a capillary coater, and the like, and then heating and paper-laminating the polarizer or the protective film by a laminated paper roll, or laminating paper by compressing the polarizer and the protective film at normal temperature, a method of irradiating UV after the paper-lamination, or the like. Meanwhile, as the adhesive, various adhesives for a polarizing plate used in the art, for example, a polyvinyl alcohol-based adhesive, a polyurethane-based adhesive, an acrylic adhesive, a cationic or radical adhesive and the like may be used without limitation.

1-4. Adhesion Layer

Meanwhile, the polarizing plate of the present invention may include an adhesion layer at the upper portion of the protective layer, if necessary, for attachment to an optical film such as a display device panel or a phase difference film.

In this case, the adhesion layer may be formed by using various gluing agents well known in the art, and the kind thereof is not particularly limited. For example, the adhesion layer may be formed by using a rubber-based gluing agent, an acrylic gluing agent, a silicone-based gluing agent, a urethane-based gluing agent, a polyvinyl alcohol-based gluing agent, a polyvinyl pyrrolidone-based gluing agent, a polyacryl amide-based gluing agent, a cellulose-based gluing agent, a vinyl alkyl ether-based gluing agent and the like. Among them, it is particularly preferred that an acrylic gluing agent is used in consideration of transparency, heat resistance and the like.

Meanwhile, the adhesion layer may be formed by a method of applying a gluing agent at the upper portion of the protective layer, and may also be formed by a method of attaching an adhesion sheet, which is manufactured by applying a gluing agent on a release sheet, and then drying the gluing agent, at the upper portion of the protective layer.

2. Image Display Device

The aforementioned polarizing plate of the present invention may be usefully applied to an image display device such as a liquid crystal display device. The image display device may be, for example, a liquid crystal display device including a liquid crystal panel and polarizing plates each provided on both surfaces of the liquid crystal panel, and in this case, at least one of the polarizing plates may be the polarizing plate according to the present invention. In this case, the kind of liquid crystal panel included in the liquid crystal display device is not particularly limited. For example, it is possible to apply all the publicly known panels such as a passive matrix type panel such as a twisted nematic (TN)-type, a super twisted nematic (STN)-type, a ferroelectric (F)-type, or a polymer dispersed (PD)-type; an active matrix type panel such as a two terminal or three terminal; an in plane switching (IPS) panel and a vertical alignment (VA) panel without being limited to the kind thereof. Furthermore, the kinds of other configurations which constitute the liquid crystal display device, for example, the kinds of upper and lower substrates (e.g., a color filter substrate, or an array substrate) and the like are not particularly limited, and the configuration publicly known in the field may be adopted without limitation.

BEST MODE

Hereinafter, the present invention will be described in more detail with reference to specific Examples.

Preparation Example 1

Manufacture of Acrylic Protective Film

A raw material pellet was manufactured by supplying a resin composition, in which poly(N-cyclohexylmaleimide-co-methylmethacrylate), a styrene-maleic anhydride copolymer resin and a phenoxy-based resin were uniformly mixed with each other at a weight ratio of 100:2.5:5, to a 24Φ extruder in which a portion from a raw material hopper to the extruder was substituted with nitrogen, and melting the mixed resin composition at 250° C.

PKFE (Mw=60,000, Mn=16,000, Tg=95° C.) manufactured by InChemRez® Co., Ltd., was used as the phenoxy-based resin, Dylaeck 332 with a content of 85 wt % of styrene and 15 wt % of anhydrous maleic anhydride was used as the styrene-maleic anhydride copolymer resin, and as the poly(N-cyclohexylmaleimide-co-methylmethacrylate) resin, a resin with a content of 6.5 wt % of N-cyclohexylmaleimide as a result of NMR analysis was used.

The obtained raw material pellet was dried under vacuum, melted by the extruder at 260° C., allowed to pass through a coat hanger-type T-die, and allowed to pass through a chrome plating casting roll and a drying roll and the like to manufacture a film having a thickness of 150 μm. A pilot stretching device was used to stretch the film at a ratio of 170% in the MD direction at 125° C. by using the difference between speeds of the rolls, thereby manufacturing an acrylic film.

After the acrylic film manufactured by the aforementioned process was subjected to corona treatment, a primer composition, in which 20 parts by weight of an oxazoline crosslinking agent (Nippon Shokubai Co., Ltd., WS700) was added to a primer composition with a solid content of 10 wt % that is prepared by diluting CK-PUD-F (Chokwang urethane dispersion) with pure water, was coated on one surface of the acrylic film with a #7 bar, and then the acrylic film was stretched at a ratio of 190% in a TD direction at 130° C. using a tenter, thereby finally manufacturing an acrylic protective film having a primer layer thickness of 400 nm.

Preparation Example 2

Preparation of Radical Curable Composition (1) Radical Curable Composition A

Radical curable composition A for a polarizing plate was prepared by adding 3 parts by weight of a radical initiator Irgacure-819 (manufactured by Ciba Specialty Chemicals Co., Ltd.) to 100 parts by weight of a resin composition prepared by adding 64.5 wt % of glyceryl monoacrylate (GLA), 16.1 wt % of hydroxyethyl acrylate (HEA), 16.1 wt % of dimethylol tricyclodecane diacrylate (DCPDA) and 3.3 wt % of di-(methacryloyloxy ethyl)phosphate.

(2) Radical Curable Composition B

Radical curable composition B for a polarizing plate was prepared by adding 3 parts by weight of a radical initiator Irgacure-819 (manufactured by Ciba Specialty Chemicals Co., Ltd.) to 100 parts by weight of a resin composition prepared by adding 56.5 wt % of glyceryl monoacrylate (GLA), 24.2 wt % of hydroxyethyl acrylate (HEA), 16.1 wt % of dimethylol tricyclodecane diacrylate (DCPDA) and 3.2 wt % of di-(methacryloyloxy ethyl)phosphate.

(3) Radical Curable Composition C

Radical curable composition C for a polarizing plate was prepared by adding 3 parts by weight of a radical initiator Irgacure-819 (manufactured by Ciba Specialty Chemicals Co., Ltd.) to 100 parts by weight of a resin composition prepared by adding 32.3 wt % of glyceryl monoacrylate (GLA), 32.3 wt % of glyceryl methacrylate (GLM), 16.1 wt % of hydroxyethyl acrylate (HEA), 16.1 wt % of dimethylol tricyclodecane diacrylate (DCPDA) and 3.2 wt % of di-(methacryloyloxy ethyl)phosphate.

(4) Radical Curable Composition D

Radical curable composition D for a polarizing plate was prepared by adding 3 parts by weight of a radical initiator Irgacure-819 (manufactured by Ciba Specialty Chemicals Co., Ltd.) to 100 parts by weight of a resin composition prepared by adding 16.1 wt % of glyceryl monoacrylate (GLA), 48.4 wt % of glyceryl methacrylate (GLM), 16.1 wt % of hydroxyethyl acrylate (HEA), 16.1 wt % of dimethylol tricyclodecane diacrylate (DCPDA) and 3.3 wt % of di-(methacryloyloxy ethyl)phosphate.

(5) Radical Curable Composition E

Radical curable composition E for a polarizing plate was prepared by adding 3 parts by weight of a radical initiator Irgacure-819 (manufactured by Ciba Specialty Chemicals Co., Ltd.) to 100 parts by weight of a resin composition prepared by adding 55.5 wt % of glyceryl monoacrylate (GLA), 13.9 wt % of hydroxyethyl acrylate (HEA), 27.8 wt % of dimethylol tricyclodecane diacrylate (DCPDA) and 2.8 wt % of di-(methacryloyloxy ethyl)phosphate.

(6) Radical Curable Composition F

Radical curable composition F for a polarizing plate was prepared by adding 3 parts by weight of a radical initiator Irgacure-819 (manufactured by Ciba Specialty Chemicals Co., Ltd.) to 100 parts by weight of a resin composition prepared by adding 72.6 wt % of glyceryl monoacrylate (GLA), 8.1 wt % of hydroxyethyl acrylate (HEA), 16.1 wt % of dimethylol tricyclodecane diacrylate (DCPDA) and 3.2 wt % of di-(methacryloyloxy ethyl)phosphate.

(7) Radical Curable Composition G

Radical curable composition G for a polarizing plate was prepared by adding 3 parts by weight of a radical initiator Irgacure-819 (manufactured by Ciba Specialty Chemicals Co., Ltd.) to 100 parts by weight of a resin composition prepared by adding 76 wt % of glyceryl monoacrylate (GLA), 19 wt % of hydroxyethyl acrylate (HEA) and 5 wt % of di-(methacryloyloxy ethyl)phosphate.

(8) Radical Curable Composition H

Radical curable composition H for a polarizing plate was prepared by adding 3 parts by weight of a radical initiator Irgacure-819 (manufactured by Ciba Specialty Chemicals Co., Ltd.) to 100 parts by weight of a resin composition prepared by adding 66.7 wt % of glyceryl monoacrylate (GLA), 16.65 wt % of hydroxyethyl acrylate (HEA) and 16.65 wt % of dimethylol tricyclodecane diacrylate (DCPDA).

(9) Radical Curable Composition I

Radical curable composition I for a polarizing plate was prepared by adding 3 parts by weight of a radical initiator Irgacure-819 (manufactured by Ciba Specialty Chemicals Co., Ltd.) to 100 parts by weight of a resin composition prepared by adding 80.6 wt % of hydroxyethyl acrylate (HEA), 16.1 wt % of dimethylol tricyclodecane diacrylate (DCPDA) and 3.3 wt % of tri-(acryloyloxy ethyl)phosphate.

Example 1

Radical curable composition A was applied on a primer layer of an acrylic film-based protective film prepared in Preparation Example 1 by using a dropper, and lamination was performed on one surface of a polarizer (PVA device), a condition was set such that the thickness of the final adhesive layer became 1 to 2 μm, and then the film was allowed to pass through a laminator (5 m/min). Then, a polarizing plate including a protective film on one surface of a polarizer was manufactured by irradiating UV light with 1,000 mJ/cm² on a surface, on which the acrylic film was laminated, using a UV irradiation device (metal halide lamp).

Next, Radical curable composition A was applied on the other surface of the surface on which the protective film of the polarizer of the polarizing plate manufactured above was laminated, a PET film having a release force was laminated, a condition was set such that the thickness of the final protective layer became 4 to 5 μm, and then the film was allowed to pass through a laminator (5 m/min). Then, a polarizing plate including a protective film on one surface of a polarizer and a protective layer on the other surface thereof was manufactured by irradiating UV light with 1,000 mJ/cm² on a surface, on which a release PET film was laminated, using a UV irradiation device (metal halide lamp), and removing the PET film.

Example 2

A polarizing plate was manufactured in the same manner as in Example 1, except that Radical curable composition B was used.

Example 3

A polarizing plate was manufactured in the same manner as in Example 1, except that Radical curable composition C was used.

Example 4

A polarizing plate was manufactured in the same manner as in Example 1, except that Radical curable composition D was used.

Example 5

A polarizing plate was manufactured in the same manner as in Example 1, except that Radical curable composition E was used.

Example 6

A polarizing plate was manufactured in the same manner as in Example 1, except that Radical curable composition F was used.

Comparative Example 1

A polarizing plate was manufactured in the same manner as in Example 1, except that Radical curable composition G was used.

Comparative Example 2

A polarizing plate was manufactured in the same manner as in Example 1, except that Radical curable composition H was used.

Comparative Example 3

A polarizing plate was manufactured in the same manner as in Example 1, except that Radical curable composition I was used.

Experimental Example 1

Hydroxyl Value

The total hydroxyl values of the radical curable compositions used in the Examples and the Comparative Examples were measured, and are shown in the following [Table 1]. In this case, the total hydroxyl value of the radical curable composition was calculated by using the following Equation (1).

$$\text{(molecular weight of KOH} \times \text{number of —OH in a sample} \times 1,000)/\text{molecular weight of the sample} \quad \text{Equation (1):}$$

Experimental Example 2

Evaluation of Adhesion

Adhesion of the protective layers of the polarizing plates manufactured in the Examples and the Comparative Examples were measured, and are shown in the following [Table 1]. Specifically, the radical curable compositions used in the Examples and the Comparative Examples were applied at a thickness of 4 to 5 μm on a polarizer (PVA device), a polarizer (PVA device) was laminated thereon and allowed to pass through a laminator, and then a UV irradiation device (metal halide lamp) was used to irradiate UV rays thereon at 1,000 mJ/cm², thereby preparing a peel strength sample composed of a polarizer/a protective layer/a polarizer. The prepared sample was left to stand under conditions of a temperature of 20° C. and a humidity of 70% for 4 days, and then cut into a width of 20 mm and a length of 100 mm, and a texture analyzer device (TA-XT Plus manufactured by Stable Micro Systems Ltd.) was used to measure a peel strength at a speed of 300 m/min and an angle of 90 degrees. In this case, the sample was indicated as excellent, good and bad when the peel strength thereof is 1.0 N/2 cm to 2.0 N/2 cm, 0.5 N/2 cm or more and less than 1.0 N/2 cm, and less than 0.5 N/2 cm, respectively.

Experimental Example 3

Evaluation of Water Resistance

Water resistance of the polarizing plates manufactured in the Examples and the Comparative Examples was measured, and is shown in the following [Table 1]. Specifically, the polarizing plates in the Examples and the Comparative Examples were laminated on a glass substrate, and then immersed in a thermostat at 60° C., and the water resistance was judged by observing whether the end portions of the polarizing plate had been discolored after 8 hours, and the cases in which no change was observed and discoloration occurred were indicated as excellent and bad, respectively.

TABLE 1

| Classification | Composition | Hydroxyl value [mgKOH/g] | Adhesion | Water resistance |
|---|---|---|---|---|
| Example 1 | A | 591 | Excellent | Excellent |
| Example 2 | B | 568 | Excellent | Excellent |

TABLE 1-continued

| Classification | Composition | Hydroxyl value [mgKOH/g] | Adhesion | Water resistance |
|---|---|---|---|---|
| Example 3 | C | 569 | Excellent | Excellent |
| Example 4 | D | 558 | Excellent | Excellent |
| Example 5 | E | 508 | Excellent | Excellent |
| Example 6 | F | 614 | Excellent | Excellent |
| Comparative Example 1 | G | 702 | Excellent | Bad |
| Comparative Example 2 | H | 593 | Good | Bad |
| Comparative Example 3 | I | 389 | Bad | Bad |

As can be seen in Table 1, it can be known that in Examples 1 to 6 of the present invention, adhesion was excellent, and water resistance was also excellent.

In contrast, it can be known that in the case of Comparative Example 1 in which (B) the compound was not included, water resistance was reduced, and likewise, in the case of Comparative Example 2, water resistance was also reduced.

Further, it can be known that in the case of Comparative Example 3 in which a phosphate compound having three acryloyl group was used as (C) the compound, both adhesive strength and water resistance were bad.

Meanwhile, in the case of the Examples, the adhesive layer and the protective layer were manufactured by using the same radical curable composition for convenience when the polarizing plate was manufactured, but the present invention is not limited thereto.

As described above, exemplary embodiments of the present invention have been described in detail, but it will be obvious to a person with ordinary skill in the art that the scope of the present invention is not limited thereto, and various modifications and changes may be made without departing from the technical spirit of the present invention described in the claims.

The invention claimed is:

1. A polarizing plate comprising:
   a polarizer; and
   a protective layer formed on at least one surface of the polarizer,
   wherein the protective layer is a cured product of a radical curable composition including: (A) a radical polymerizable compound including at least one hydrophilic functional group in a molecule thereof; (B) a multifunctional (meth)acrylic compound; (C) a phosphate compound including one or two (meth)acryl group in a molecule thereof; and (D) a radical initiator.

2. The polarizing plate of claim 1, wherein the radical curable composition comprises more than 30 parts by weight and 93 parts by weight or less of (A) the radical polymerizable compound having at least one hydrophilic functional group in a molecule thereof; 5 to 40 parts by weight of (B) the multifunctional (meth)acrylic compound; 1 to 40 parts by weight of (C) the phosphate compound including one or two (meth)acryl groups in a molecule thereof; and (D) 0.5 to 20 parts by weight of the radical initiator, based on 100 parts by weight of the radical curable composition.

3. The polarizing plate of claim 1, wherein the radical curable composition has a total hydroxyl value of 500 to 900 mg KOH/g.

4. The polarizing plate of claim 1, wherein the hydrophilic functional group of (A) the radical polymerizable compound is a hydroxy group.

5. The polarizing plate of claim 4, wherein (A) the radical polymerizable compound is a mixture of (a-1) a radical polymerizable compound having one hydroxy group in a molecule thereof and (a-2) a radical polymerizable compound having at least two hydroxy groups in a molecule thereof.

6. The polarizing plate of claim 1, wherein (B) the multifunctional (meth)acrylic compound comprises one or more selected from the group consisting of compounds represented by the following [Formula I] to [Formula III]:

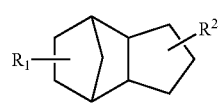

[Formula I]

in [Formula I], $R_1$ and $R_2$ are each independently a (meth)acryloyloxy group or a (meth)acryloyloxy alkyl group,

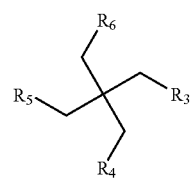

[Formula II]

in [Formula II], $R_3$, $R_4$ and $R_5$ are each independently a (meth)acryloyloxy group, or a (meth)acryloyloxy alkyl group, and $R_6$ is a (meth)acryloyloxy group, a (meth)acryloyloxy alkyl group, a hydroxy group, or a substituted or unsubstituted $C_{1~10}$ alkyl group,

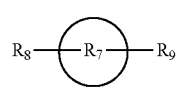

[Formula III]

in [Formula III], $R_7$ is a substituted or unsubstituted $C_{1~10}$ alkylene, and $R_8$ and $R_9$ are each independently a (meth)acryloyloxy group or a (meth)acryloyloxy alkyl group.

7. The polarizing plate of claim 1, wherein (C) the phosphate compound comprises a compound represented by the following [Formula IV]:

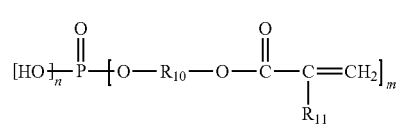

[Formula IV]

in [Formula IV], $R_{10}$ is a substituted or unsubstituted $C_{1~10}$ alkylene group, a substituted or unsubstituted $C_{4~14}$ cycloalkylene group, a substituted or unsubstituted $C_{6~14}$ arylene group, or a combination thereof; $R_{11}$ is hydrogen or a methyl group; and n is an integer of 1 and 2, m is an integer of 1 and 2, and n+m =3.

8. The polarizing plate of claim 1, wherein the protective layer has a thickness of 0.5 to 20 μm.

9. The polarizing plate of claim 1, wherein a protective film is attached to a surface opposite to a surface of the polarizer, on which the protective layer is formed, through an adhesive layer.

10. The polarizing plate of claim 1, further comprising:
an adhesion layer at an upper portion of the protective layer.

11. An image display device comprising the polarizing plate of claim 1.

* * * * *